United States Patent [19]

Bonds

[11] 3,948,545
[45] Apr. 6, 1976

[54] MECHANICALLY OPERATED BREECH BLOCK

[75] Inventor: James Vaull Bonds, Houston, Tex.

[73] Assignee: McEvoy Oilfield Equipment Co., Houston, Tex.

[22] Filed: Mar. 11, 1974

[21] Appl. No.: 449,616

[52] U.S. Cl. .................. 285/4; 285/39; 285/91; 285/93; 285/391
[51] Int. Cl.² ........................................ F16L 35/00
[58] Field of Search ........... 285/317, 18, 84, 91, 85, 285/92, 3, 86, 24, 27, 4, 39, DIG. 21, 93, 391; 166/.6, .5

[56] References Cited
UNITED STATES PATENTS

| | | | |
|---|---|---|---|
| 2,145,512 | 1/1939 | Hudson et al. | 285/3 X |
| 2,244,124 | 6/1941 | Shemeley | 285/84 X |
| 3,240,511 | 3/1966 | Bishop et al. | 285/317 X |
| 3,421,580 | 1/1969 | Fowler et al. | 166/.5 |
| 3,442,536 | 5/1969 | Fowler et al. | 285/332.2 X |
| 3,700,267 | 10/1972 | Piegza | 285/DIG. 21 |
| 3,800,869 | 4/1974 | Herd et al. | 166/.5 |

*Primary Examiner*—Dave W. Arola
*Attorney, Agent, or Firm*—David M. Ostfeld; Ned L. Conley; Murray Robinson

[57] ABSTRACT

A vertical string of pipe such as is used in an offshore piling comprising a plurality of pipe joints connected together by connector means, each connector means comprising a breech block type connection with a latch to hold the connector means in engagement, one of the connector means latches being remotely disengageable by means of a releasing tool lowered down through the string of pipe, the one latch including a bar extending radially through the wall of the connector means to engage the latch, the bar being movable radially outwardly upon being engaged by the releasing tool so as to either break off a portion of the latch or move the latch out of engagement.

21 Claims, 23 Drawing Figures

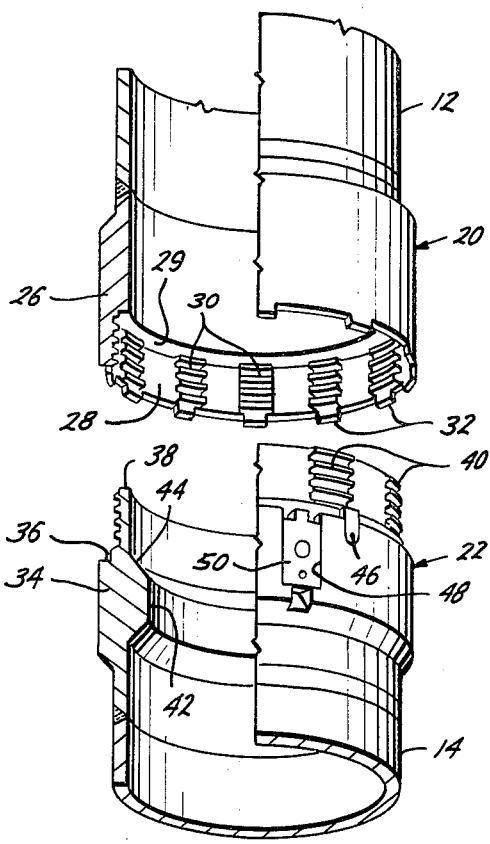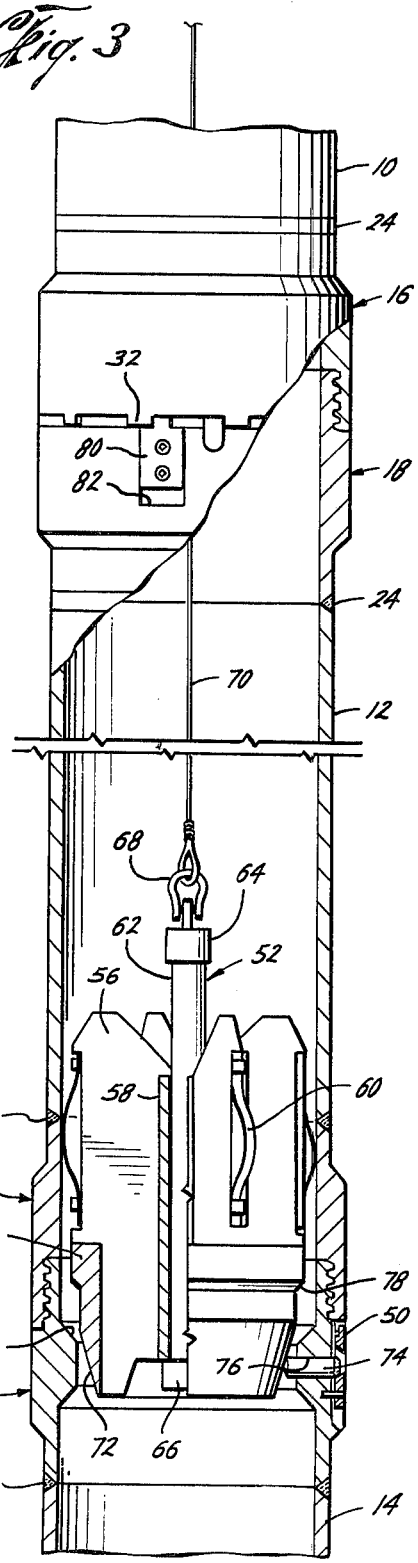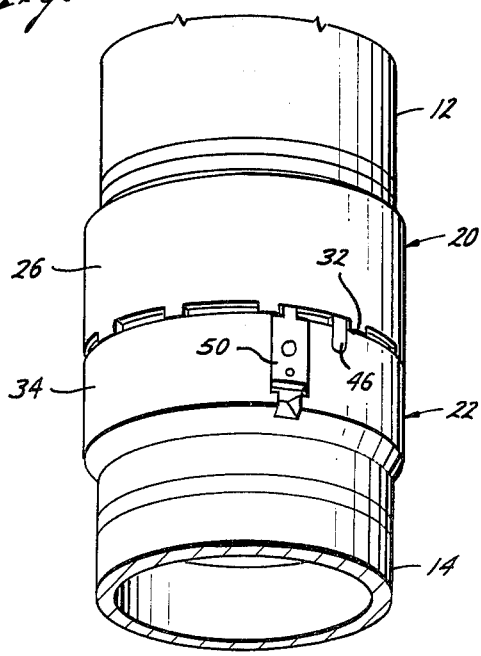

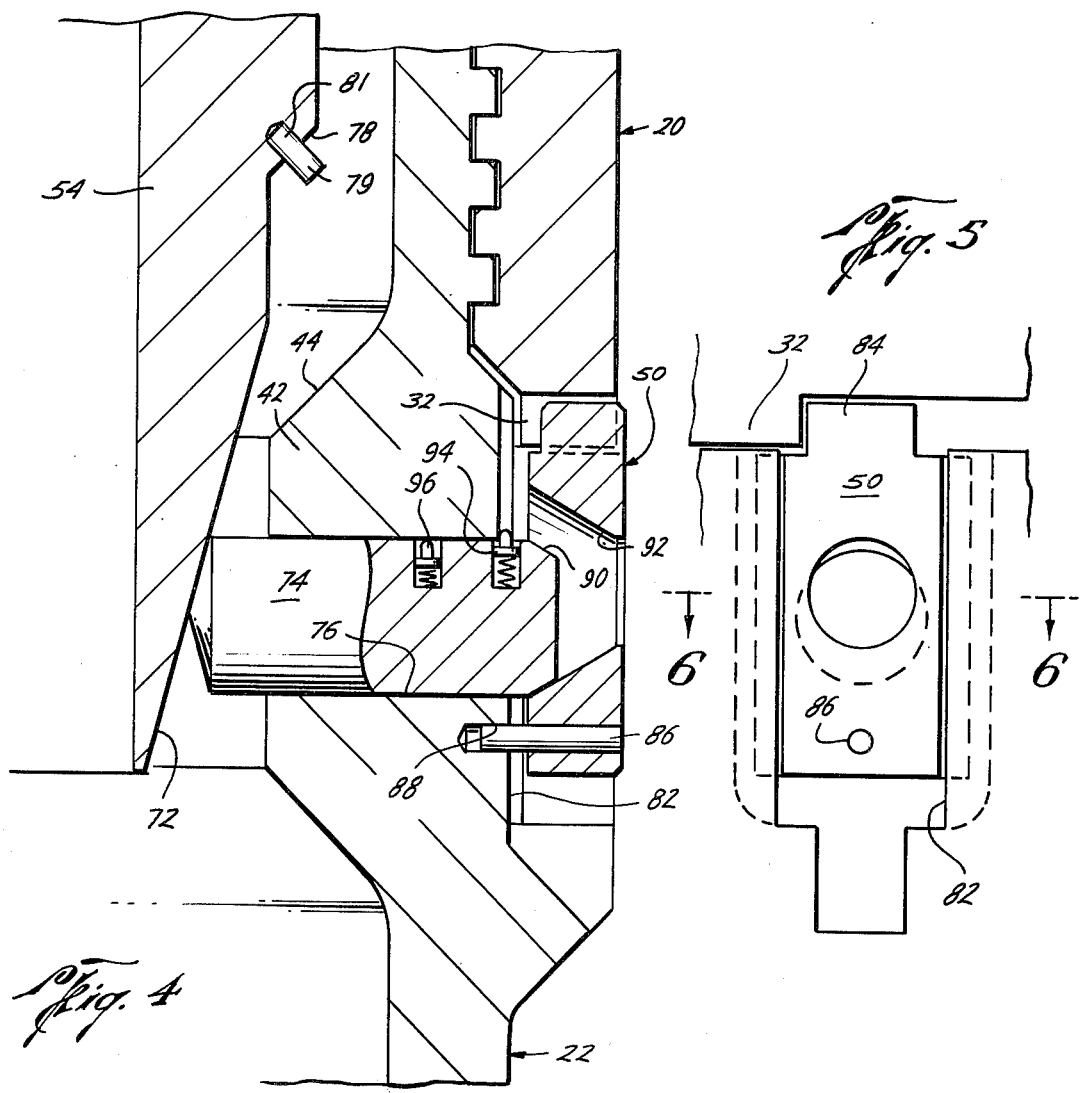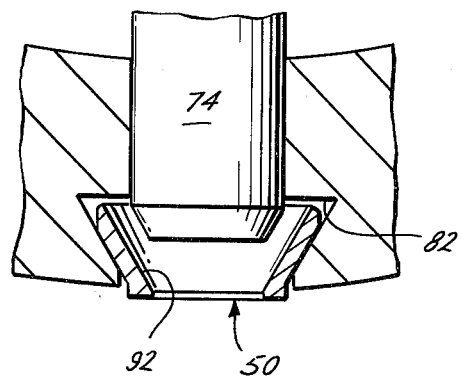

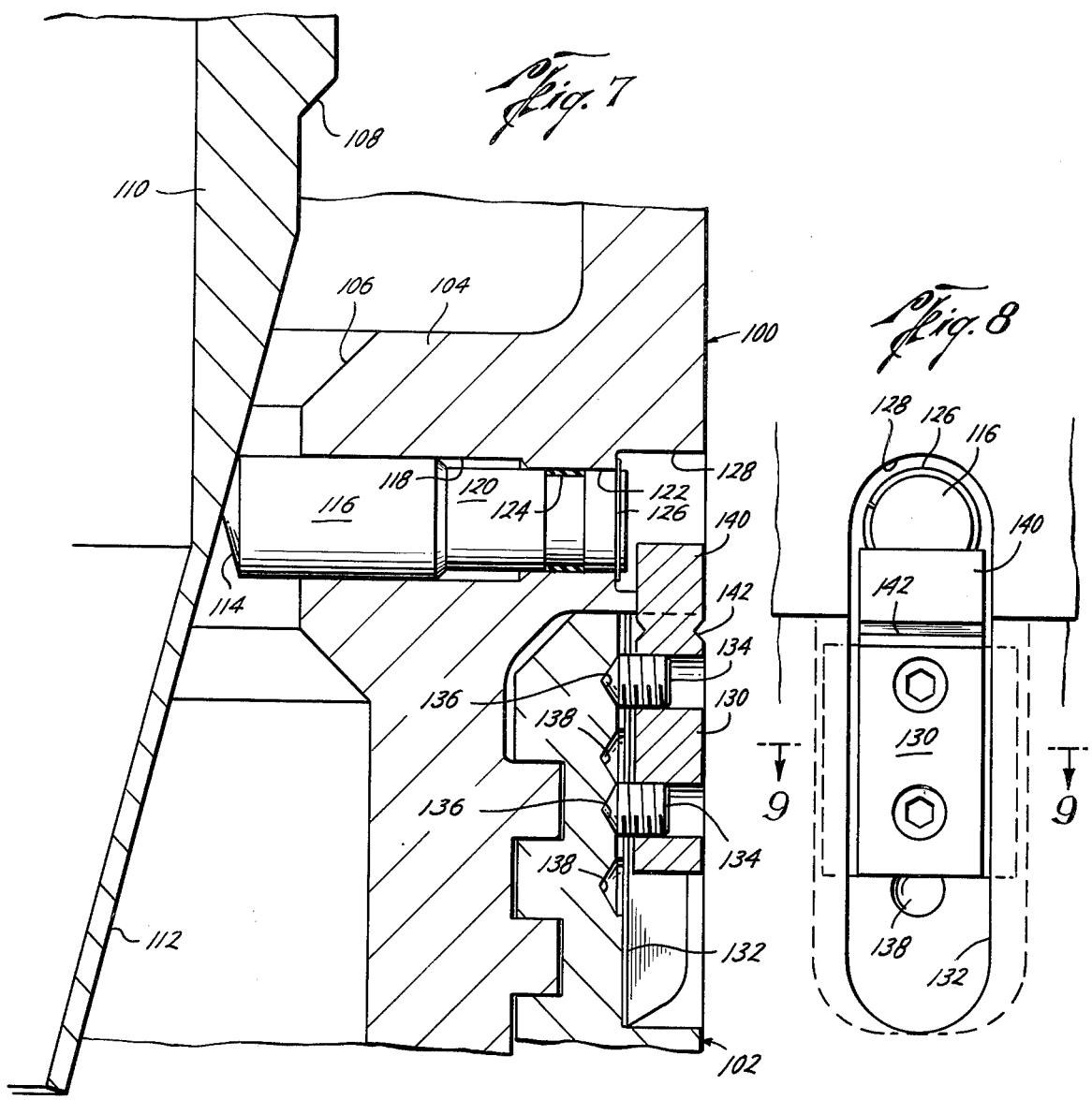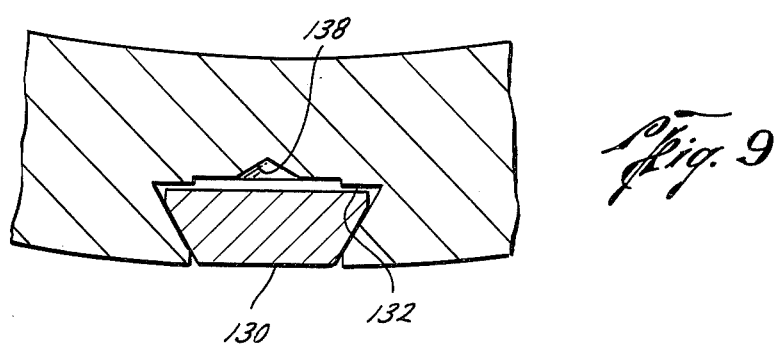

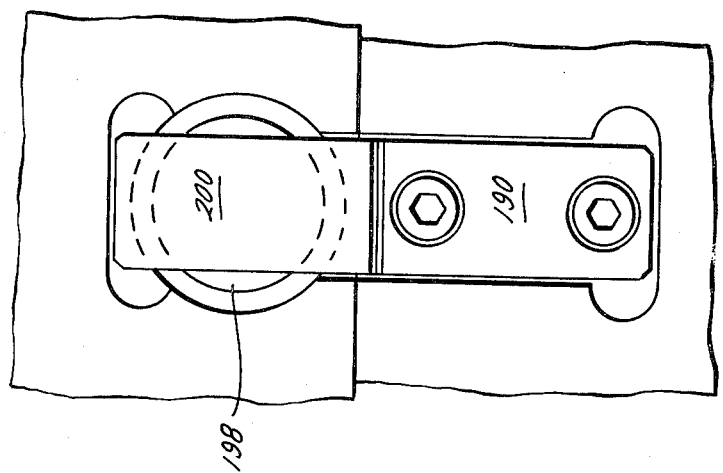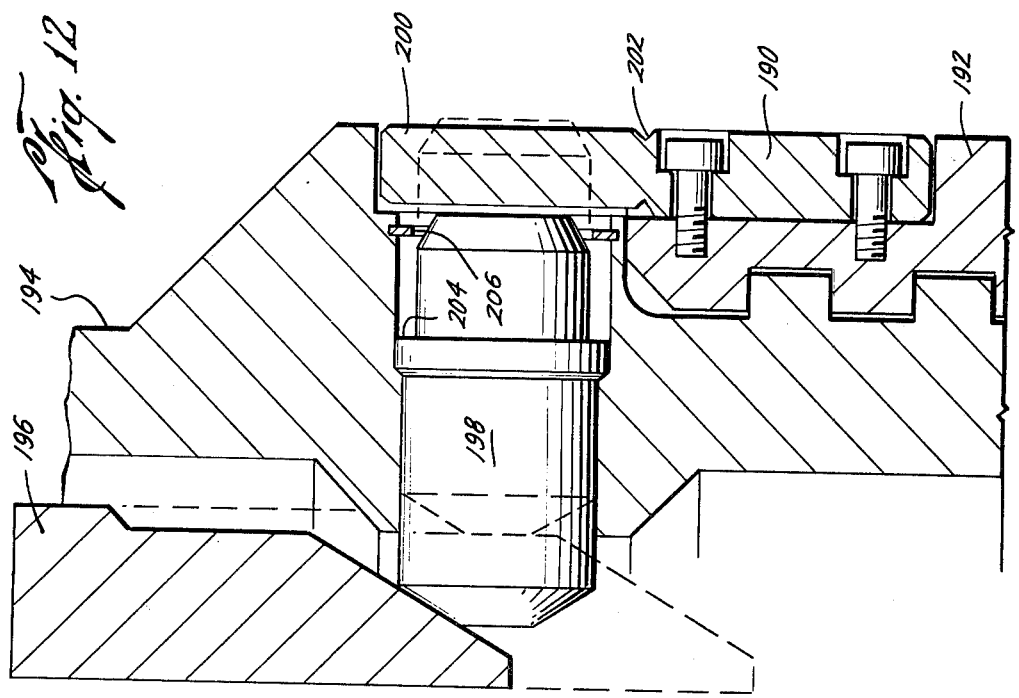

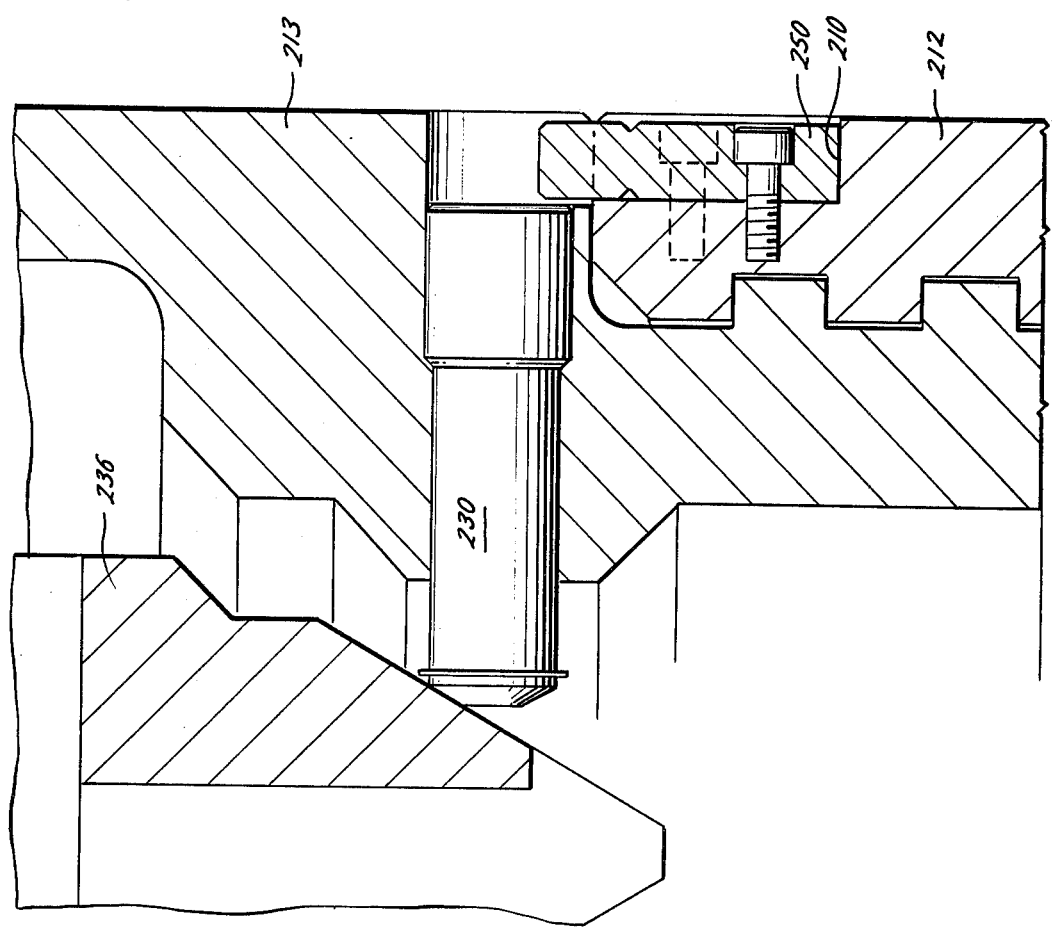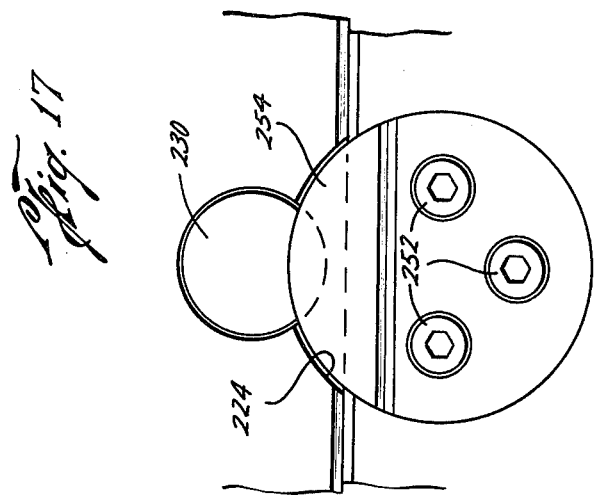

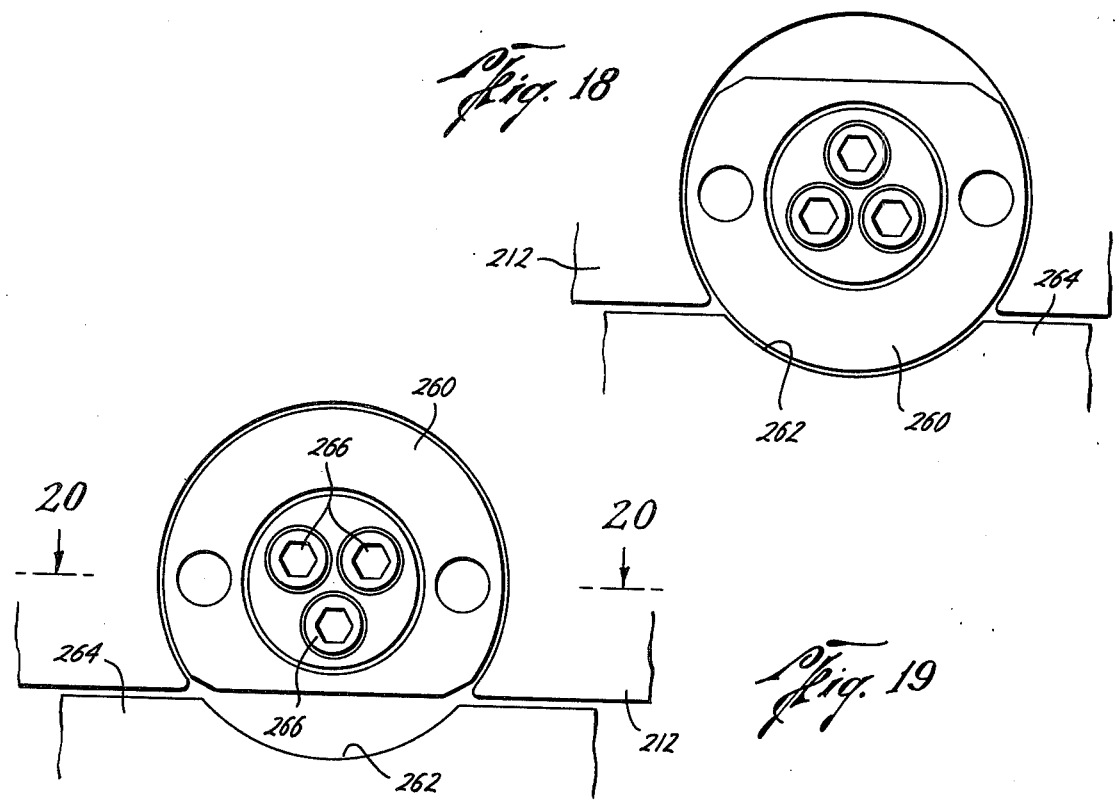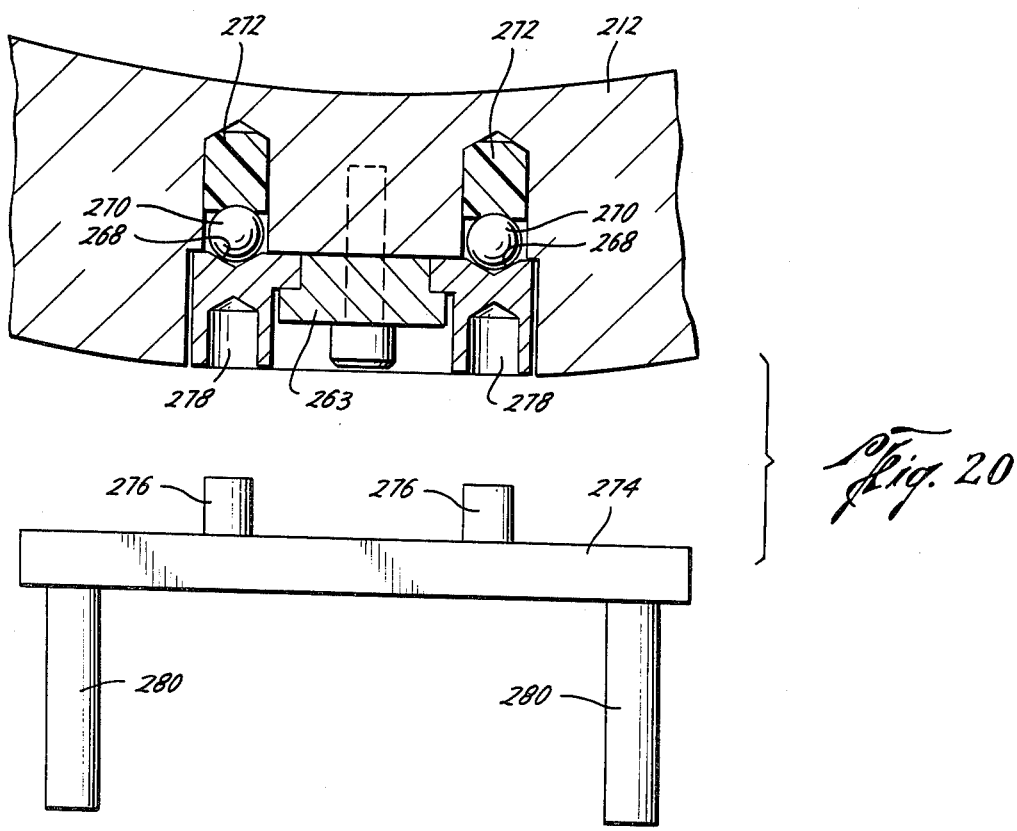

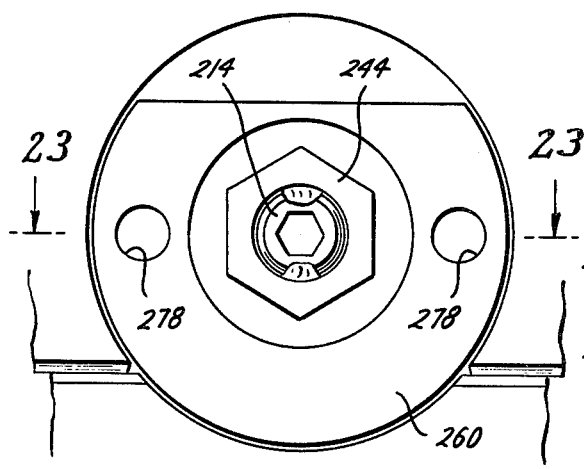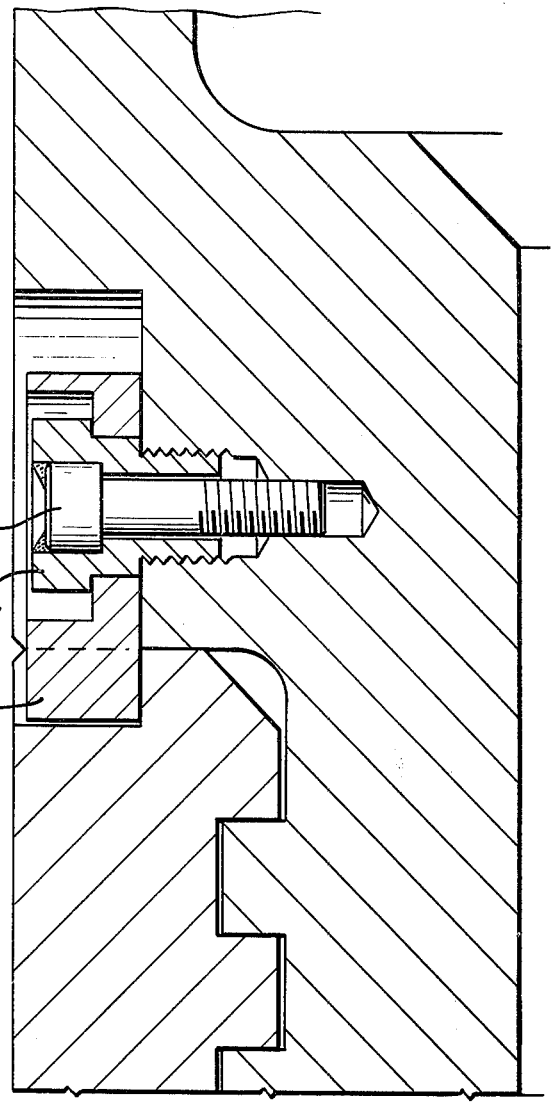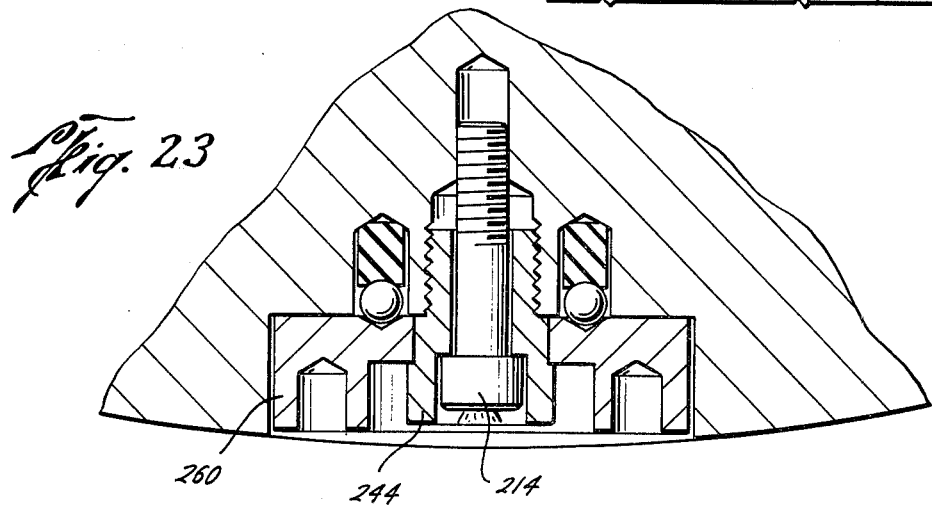

MECHANICALLY OPERATED BREECH BLOCK

BACKGROUND OF THE INVENTION

1. Field of the Invention

This invention relates to apparatus for connecting and disconnecting joints of pipe, particularly pipe joints in a string of pipe in an offshore location, such as used for piling or as used for conductor casing on an offshore well.

2. Description of the Prior Art

In the drilling of offshore oil and gas wells it is necessary to sink large pipes into the subsea bottom, such pipes consisting of a number of joints of pipes connected together end to end. For example, such pipes may consist of a conductor casing which is drilled, driven or jetted into the sea floor a substantial distance, and which has connected to its upper end and extending upwardly to an above-water platform or floating vessel a conductor riser which constitutes a large diameter pipe through which drilling operations are performed.

In addition, the support legs of offshore plateforms from which drilling operations are performed often consist of pipe through which hollow steel pilings are driven or drilled into the sea bed.

Each of such pipes have been connected by various means in the past, including ordinary screw threads, welding, clamps, and a special type of breech block connection such as is shown, for example, in U.S. patent application Ser. No. 103,839, filed Jan. 4, 1971, which is assigned to the assignee of the present application.

In making up the aforesaid strings of pipe, a first joint of pipe is lowered from a platform or vessel and following joints of pipe are connected in sequence above it. As each connection is made, the string of pipe is lowered until it sinks down into the sea bottom and the drilling, driving or jetting operation is then performed to sink the string deeper into the sea bottom, with additional joints of pipe being added as necessary. Because of many advantages found therein, the breech block connector, as, for example, of the type described in the aforesaid patent application Ser. No. 103,839 has been found to be particularly advantageous. Such connections are made up at the surface and the connection is secured by a latch to prevent any possibility of the connection being released at an underwater or underground location. Examples of such breech block joints and latches thereon may be found, for example, in U.S. Pats. No. 3,421,580 and 3,442,536, and in U.S. application Ser. No. 387,667, filed Aug. 13, 1973 and assigned to the assignee of the present application.

In some instances it is necessary to disconnect a joint in a string of such pipe. For example, in the case of the conductor casing for an oil well, the conductor riser may be disconnected after the well is completed, since it is not needed thereafter. In the past it has been necessary to stop all operations on the platform and send a diver down to release the latch so that the joint may be disconnected. This has been a very undesirable and expensive practice, because no operations can be performed while the diver is under water, and the operation may take several hours in many cases. Furthermore, where the water is extremely deep or cold, there is a high current flowing, or the connection to be released is buried in the mud, it is difficult if not impossible for a diver to release it.

U.S. patent application Ser. No. 350,982, filed Apr. 13, 1973 and assigned to the assignee of the present application, such a connection having a latch which is remotely operable to disengage the connection. The latch shown there is resiliently biased in latching position, and a hydraulic cylinder is connected to the latch. Means are provided for applying hydraulic fluid under pressure to the hydraulic cylinder to release the latch. This apparatus is well suited to many applications, but suffers the disadvantage of requiring hydraulic lines to be run down the string of pipe to the joint which is to be disconnected. Because of the possibility of damage to the hydraulic system, it is necessary to provide an auxiliary manual means for releasing the latch.

SUMMARY OF THE INVENTION

It is an object to this invention to provide a latch which is remotely releasable by mechanical means so as to avoid the possibility that it will be necessary to use a diver or other means to release the latch.

Another object to this invention is to provide a pipe structure suitable for offshore use where joint connections are readily made up at the surface, and a selected connection is readily separated at a remote location after the pipe string is put into place.

According to this invention a structure is provided wherein first and second tubular connectors are adapted to engage each other to coaxially connect a pair of pipes, such connectors including cooperative latch means on the outside of the connectors which are adapted to be positioned to latch the connectors against disengagement, and including means extending through the wall of the connector for engagement by a releasing tool inside the connectors to release the latch. The latch is released merely by lowering a camming device down inside of the pipe so that the weight of the device provides a positive force which necessarily results in the release of the latch.

BRIEF DESCRIPTION OF THE DRAWING

FIG. 1 is an exploded isometric quarter section view of a pipe connection according to one embodiment of this invention;

FIG. 2 is an isometric view of the embodiment of FIG. 1, with the male and female elements connected together;

FIG. 3 is a vertical sectional view of a string of pipe which incorporates one embodiment of the connector, latch and release means of this invention;

FIG. 4 is an enlarged fragmentary sectional view of the embodiment of the latch shown in FIG. 3;

FIG. 5 is a fragmentary elevational view of the embodiment of the latch shown in FIG. 4;

FIG. 6 is a horizontal sectional view of the embodiment of FIG. 4, taken at line 6—6 of FIG. 5;

FIGS. 7, 8, and 9 are views similar to FIGS. 4, 5, and 6, showing a different embodiment;

FIGS. 12 and 13 are views similar to views 4 and 5, showing still another embodiment;

FIGS. 16 and 17 are views similar to FIGS. 4 and 5, showing still another embodiment;

FIG. 18 is an elevational view of still another embodiment of the latch of this invention;

FIG. 19 is an elevational view of the embodiment shown in FIG. 18, with the latch shown turned to disengaged position;

FIG. 20 is an exploded view showing a horizontal section of the latch shown in FIG. 19 taken at line 20-20 of FIG. 19 together with a tool for operating this embodiment of the latch;

FIG. 21 is a vertical sectional view of still another embodiment of the latch of this invention;

FIG. 22 is an elevational view of the embodiment of FIG. 21; and

FIG. 23 is a horizontal sectional view of the embodiment of FIG. 21, taken at line 23—23 of FIG. 22.

Figure 11:
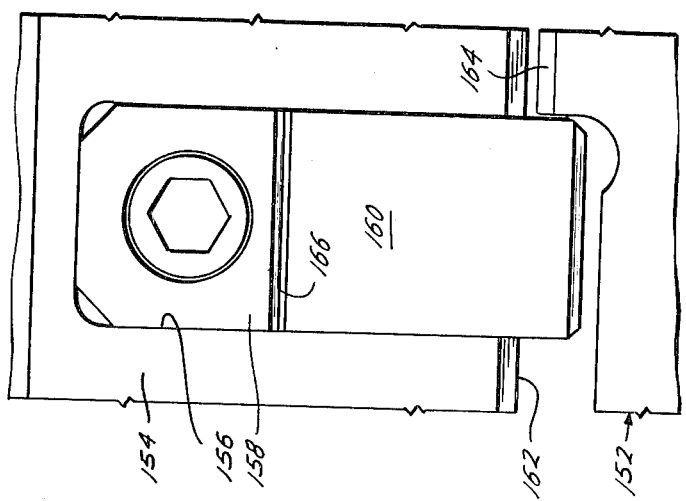
FIGS. 10 and 11 are views similar to FIGS. 4 and 5, showing a still further embodiment.

A number of variations in the structure of the latch of this invention are disclosed in the drawing but these are illustrative only and are not intended to include all possible variations of structure which may be included within the invention.

DESCRIPTION OF THE PREFERRED EMBODIMENTS

FIG. 3 of the drawing illustrates a typical string of pipe with connectors according to this invention connecting three joints of pipe 10, 12 and 14. Thus pipes 10 and 12 are connected together by means of female connector 16 and male connector 18 and pipes 12 and 14 are connected together by means of a female connector 20 and male connector 22. Each of the connectors is attached to the end of a joint of pipe as by means of welds 24.

As seen in FIG. 3, the female connectors 16 and 20 may be identical in this embodiment, but there are substantial differences in the male connectors 18 and 22, as will hereinafter appear.

The connection between connectors 20 and 22 is more readily seen by reference to FIGS. 1 and 2. As best seen in FIG. 1, in this preferred embodiment of the invention the connectors comprise a modified form of breech block connection, as is fully described in the aforesaid U.S. patent application Ser. No. 103,839. However, the latch of this invention may also be used with threaded connections and other types of connections well known in the art.

The embodiment shown here is an external upset, or internally flush, connection, in which the female connector element 20 comprises an enlarged diameter portion 26 which is counterbored at 28 to form a shoulder 29, and which has formed in the counterbore a plurality of circumferentially spaced apart groups 30 of axially spaced apart no-lead threads. By "no-lead" is meant that the threads have zero pitch. The threads may have a square profile, although buttress or Acme threads or the like may also be used. Any desirable number of such groups may be utilized, but for ease of makeup it has been found desirable to utilize groups of threads spaced 30° to 60° apart, depending upon the size of the conductors, so that from 6 to 12 groups of threads may be provided.

The lower end of the female member 20 is castellated, being provided with a plurality of axially extending stop lugs 32 which preferably are spaced apart the same angle as the thread groups.

The male member 22 is provided with a circumferentially extending enlarged flange 34 providing a circumferential shoulder 36, facing the stop lugs 32 of the female member, and between the shoulder 36 and the end 38 of the male member 22 there is provided a plurality of circumferentially spaced apart groups 40 of axially spaced apart no-lead threads which are of such a size and spacing as to match with the groups of threads 30 in the female member.

The male connector member is also provided with an inwardly directed flange 42 forming an upwardly facing tapered shoulder 44. As will later be seen, this shoulder provides a stop for the latch releasing tool.

In the outer flange 34 an upwardly extending stop 46 extends beyond the shoulder 36, being positioned in a slot in the flange 34 and fixed in place, as by welding. The flange 34 is also provided with an axially extending groove 48 in which is retained a movable latch 50, as will hereinafter be explained.

It is apparent that upon movement of the male and female members 22 and 20 axially toward each other with their angular dispositions such that the thread groups 30 of the female member fit between the thread groups 40 of the male member the end 38 of the male member will move to engagement with the bottom 29 of the counterbore 28. The stop 46 fits between the stops 32. Then upon relative rotation of the male and female members the groups of threads will move into engagement with each other, rotation being stopped by engagement of the stop 46 with one of the stops 32. The latch 50 may then be manually moved upwardly so that it bears against the opposite side of another of the stops 32 so that the connectors are then prevented from rotating relative to each other and cannot become disconnected, the latch then being fastened in place. The connectors are then in the condition shown in FIG. 2 of the drawing.

FIG. 3 of the drawing illustrates one form of releasing tool 52 which may be utilized according to this invention. This releasing tool comprises an actuating ring 54 mounted on a plurality of radially extending ribs 56 welded to a central sleeve 58. Each rib has mounted on its radially outward surface a conventional bow spring centralizer 60. The sleeve 58 has slidably received therein a cylindrical mandrel 62 which is provided with enlarged portions 64 and 66 at its ends, the mandrel being longer than the sleeve and slidably received therein so that it can move upwardly and downwardly between the collars 64 and 66. The upper collar has attached thereto a bail 68 to which a wire line 70 is connected. Alternatively the releasing tool may be constructed for lowering on a pipe, or it may be just dropped freely. To increase the weight of the releasing tool the mandrel 52 may be filled with concrete or the like. As may be seen in the drawing the actuating ring 54 includes a beveled surface 72 which comprises a camming surface positioned to engage a radially extending bar 74 which is slidably received in an aperture 76 in the wall of the connector 22. The actuator ring also has a beveled shoulder 78 proportioned to engage the beveled shoulder 44 on the upper surface of the internal flange 42.

It will be seen that the connection between the female and male connectors 16 and 18 is similar to that between the connectors 20 and 22. However, this connection is a true internally flush connection, since the male connector 18 does not have the internally extending flange. The radially extending bar 74 and the latch 50 are also deleted. Instead, these connectors are prevented from disengaging by a latch 80 which is bolted, pinned, welded or otherwise secured in place. For example, this latch may fit in a dovetail crosssection groove 82 and be moved up into engagement with the stop 32 after the male and female connectors are engaged with each other. No means are provided for remote release of this latach.

The embodiment of the latch 50 shown in FIGS. 1, 2 and 3 is shown in greater detail in FIGS. 4, 5 and 6. As there shown, the latch 50 is carried within a groove 82 which is dovetailed in cross-section and which has a length greater than the length of the latch so that the latch can be moved longitudinally therein. The latch is held in the position shown whereby its upper porton 84 fits between two of the stops 32 by means of a shear pin 86 which is driven through the latch and into a hole 88 in the male connector member 22. The radially extending bar 74 has a bevel 90 on its outer end which extends into a tapered hole 92 through the latch 50. The bar is provided with a pair of radially extending detents 94 and 96, detent 94 preventing the bar from moving radially inwardly to the inside of the coupling when the latch is engaged, as shown in the drawing, and the detent 96 preventing the bar from moving radially inwardly after the bar has actuated the latch to disengage it.

The other end of the bar 74 is preferably beveled as shown for engagement by the camming surface 72 of the actuating ring 54. Thus when the releasing tool is dropped down through the pipe the camming surface 72 engages the end of the bar 74, forcing the bar radially and outwardly. The bevel 90 thereby engages the tapered hole 92 in the latch 50 causing the latch to be moved downwardly, shearing the pin 86. This retracts the upper end 84 from engagement with the stops 32 on the end of the female connector member 20. The female connector may then be rotated the requisite amount to disengage the groups of threads 30 and 40, and the pipe joints above this connection can then be raised to disconnect them from the pipe joint below this connection.

In the event that the force of the falling release tool does not result in release of the latch on the first try, the mandrel 62 may be raised and dropped to hammer the release tool downwardly. When the shoulder 78 engages the shoulder 44 the release tool is prevented from moving downwardly any further.

In order that the operator may determine that the releasing tool has gone all the way down to the shoulder, a plug 79 of lead or other soft material is inserted into a hole 81 drilled into the bevel 78 on the releasing tool. When this plug strikes the shoulder 44 it will be mashed flat. Thus when the releasing tool is retrieved the operator will know that shoulders 78 and 44 have engaged, and therefore that the latch has necessarily been released.

The embodiment of the invention shown in FIGS. 7, 8 and 9 is shown as applied to an externally flush connection as opposed to the internally flush connection shown in FIGS. 1 to 6 inclusive. Thus in the externally flush connection the external collars 26 and 34 are omitted, thickness being added to the wall of the connectors on the inside in order to provide sufficient material for the connecting mechanism. Also, in the embodiment shown in FIGS. 7, 8 and 9 the upper connector 100 is a male connector and the lower connector 102 is a female connector. In this embodiment the male connector 100 has an internally extending flange 104 which is beveled on its upper corner at 106 for engagement by the shoulder 108 of the releasing tool 110. The releasing tool shown has a somewhat different actuating ring which includes an elongate tapered camming surface 112 for engaging the beveled end 114 of the radially extending bar 116. The bar extends through the port 118 which passes through the flange 104 outwardly to the exterior of the male coupling member 100. The bar 116 has a reduced diameter portion 120 which fits closely within a smaller portion 122 of the bore 118, and which is sealed against leakage therethrough by packing 124. A snap ring 126 engages the bottom of a counterbore 128 to prevent the bar from accidentally moving radially inwardly.

The latch 130 is slidably received in a dovetail groove 132, the latch having a trapezoidal cross-section to fit the groove. The latch is secured in position by set screws 134 which engage dimples 136 when the connection is latched, as shown in the drawing, or dimples 138 when the connection is unlatched. The upper end of the latch 130 is narrowed on both sides to a substantially rectangular cross-section portion 140, preferably having a pair of transverse breaking notches 142 on both the inner and outer sides. The upper portion 140 extends upwardly into the opening 128 in the male member 100, opposite the end of the bar 116.

Thus prior to assembly the latch 130 may be installed in the groove 132 with the set screws 134 engaging the dimples 138 to hold the latch in disengaged position. Then when the male member is lowered into engagement with the female member and rotated so that the thread groups engage with each other, the set screws may be loosened and the latch moved upwardly to the position shown in the drawing. Tightening of the set screws in the dimples 136 insures that the latch is held in this position and prevents separation of the male and female connectors. The pipe string may then be driven down without danger of the connection accidentally coming apart during the driving operation. Once the driving is completed the releasing tool may be dropped into the string of pipe so that the camming surface 112 engages the end 114 of the bar 116, forcing the bar radially outwardly against the upper portion 140 of the latch and breaking it off. The upper male connector may then be rotated to disengage the thread groups, and the upper portion of the pipe string may be pulled vertically upwardly.

Figure 10:
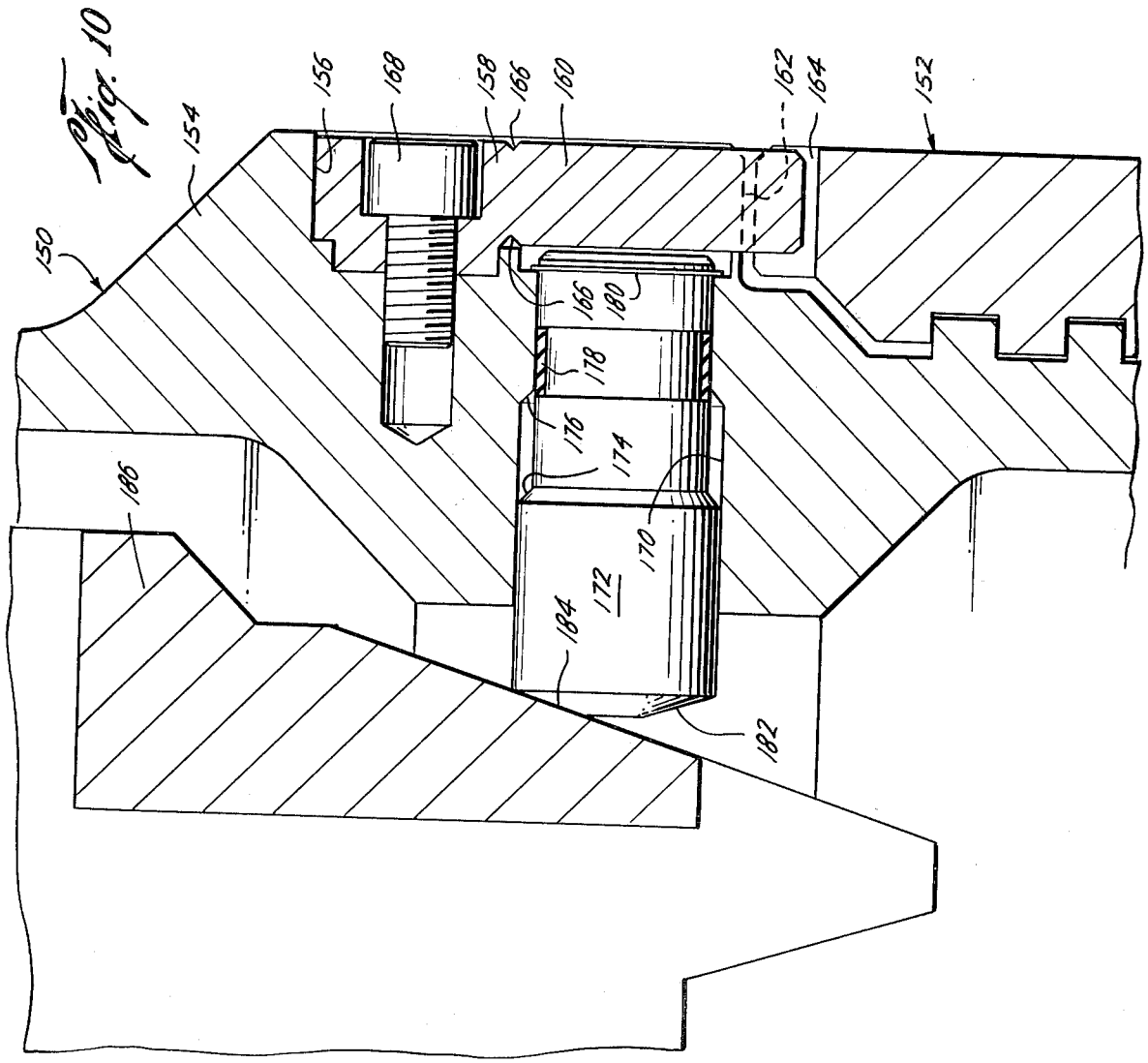

FIGS. 10 and 11 disclose an embodiment for use in an internally flush connection system wherein the upper connector is a male member 150 and the lower member is a female member 152. The male member has an outwardly extending flange 154 having a notch 156 formed therein to receive a latch 158. The latch has a lower portion 160 which extends downwardly beyond the shoulder 162 on the male member, existing between stops 164 formed on the upper end of the female member 152, similarly as stops 32 on the female member 20 shown in FIG. 1. Transverse notches 166 separate the lower portion 160 from the main body of the latch 158. The latch is held in place in the groove 156 by means of a socket head cap screw 168 which is threadedly received in the flange 154, and which may be welded in place, if desired. The notches 166 are not essential since the latch may break at another place, or the head of the capa screw may be pulled off.

A radially extending passageway 170 extends from the inside of the connector 150 to intersect the bottom of the groove 156 and has therein a bar 172 having a shoulder 174 proportioned for engagement with a corresponding shoulder 176 in the passageway 170. A packing member 178 surrounds the reduced diameter portion of the bar 172 to seal between the bar and the passageway. A snap ring 180 on the end of the bar prevents the bar from being moved radially inwardly into the bore of the connector. The bar is tapered on its opposite end at 182 for engagement by a camming surface 184 on the releasing tool 186.

It will be seen that this latch is released similarly to that of FIGS. 7, 8, and 9, the force of the releasing tool against the bar 172 causing the bar to strike the portion 160 of the latch, breaking it off from the body of the latch at the notches 166.

The embodiment shown in FIGS. 12 and 13 is similar to that of FIGS. 10 and 11, the primary difference being that the latch 190 is attached to the lower female connector member 192 instead of to the upper male connector member 194. When the release tool 196 is dropped down the string of pipe it forces the bar 198 radially outwardly to cause the upper portion 200 of the latch to break off at the notches 202. The bar 198 is prevented from moving further outwardly by the engagement of the shoulder 204 thereon with a snap ring 206.

Each of the latches disclosed in FIGS. 4 to 13 inclusive is remotely releasable by means of a releasing tool which engages a radially movable bar, the bar either causing movement of a latch to a disengaged position or breaking off of a portion of the latch so as to disengage it. However, in any string of pipe it is likely that it will be desirable to have only one connection which is remotely disengageable, the other connections being latched together at the surface, and remaining in the latched condition. It is apparent that any of the latches previously described can be used for those connections which are not remotely disengageable, it only being necessary to omit the radially movable bar and any internally extending flange which may exist. This will result in a high degree of interchangeability of parts.

The latches shown in FIGS. 14 to 23 inclusive, are circular discs which in a remotely disengageable connection has a segment which can be broken off by the radially outwardly moving bar, and in the connection which is not remotely disengageable may have a segment removed and be rotatable to a position latching the connection together.

Figures 14, 15:
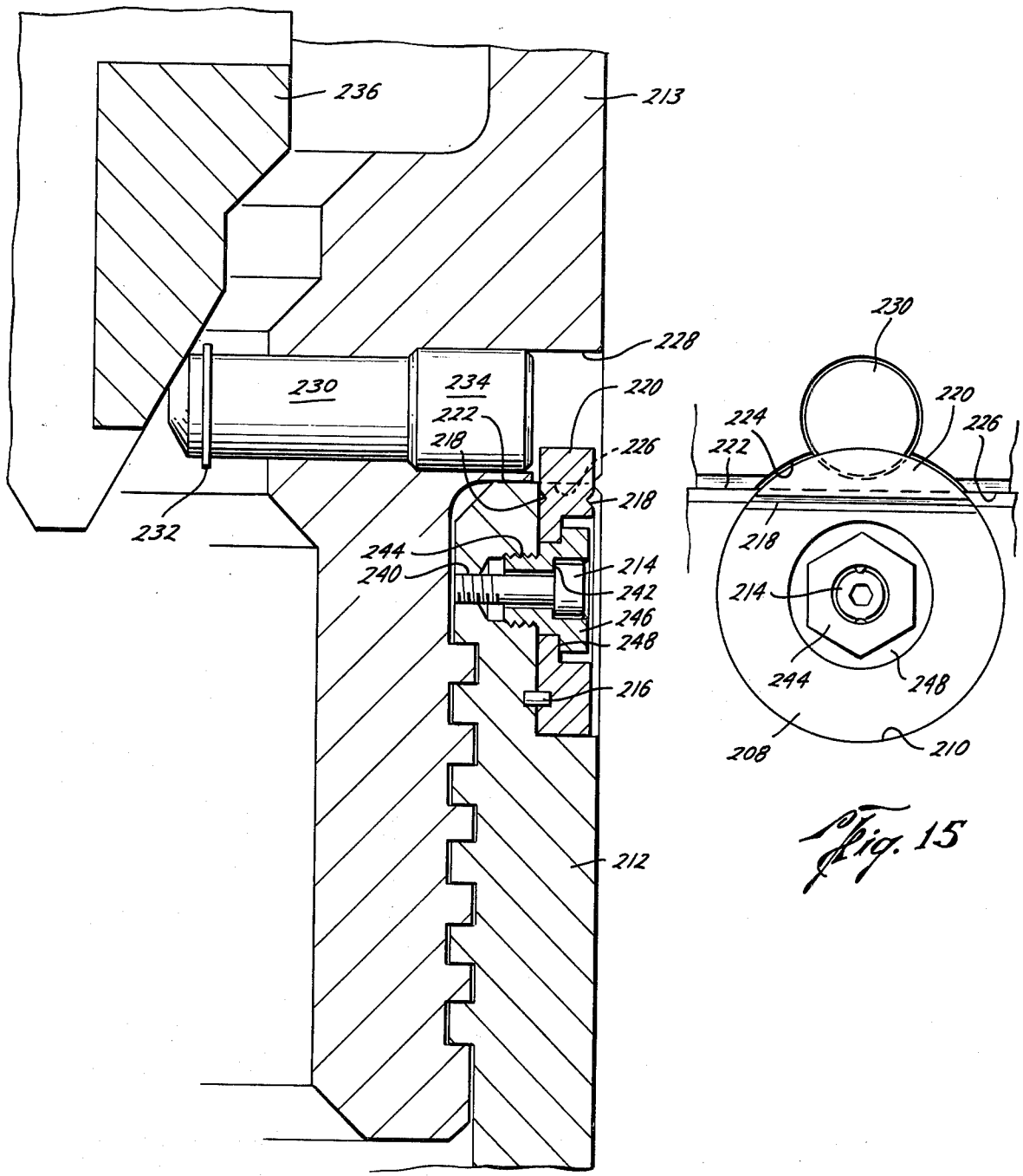
FIGS. 14 and 15 are views similar to FIGS. 4 and 5, showing still another embodiment.

The embodiment shown in FIGS. 14 and 15 has a latch 208 which is fastened in a circular recess 210 of the lower female connector member 212, being held in place by means of a cap screw 214 and a pin 216 which prevents rotation. A pair of notches 218 form chords which separate a segmental portion 220. The portion 220 extends above the upper end 222 of the female member 212 into a segmental notch 224 formed in a downwardly facing shoulder 226 on the male connector member. A radial passageway 228 in the male connector member intersects the segmental notch 224 and contains a bar 230 which has a snap ring 232 on its inner end to prevent the bar from moving outwardly out of the passageway and an enlarged portion 234 to prevent the bar from moving inwardly from the passageway. A releasing tool 236 is used to strike the bar and cause it to break off the segment 220 of the latch 208.

Latch 208 is held in place in the female member 212 by means of the cap screw 214 which is threadedly received into a threaded opening 240 in the female connector, bearing against a shoulder 242 in a bushing 244 which is threadedly engaged with the female member 212. The bushing 244 is provided with a hexagon-shaped head 246 which bears against a shoulder 248 of a counter bore in the latch 208. The threads on screw 214 have a pitch which is different from the threads of bushing 244, and these elements are welded together so they can't back out.

The embodiment of the invention shown in FIGS. 16 and 17 is substantially identical to that shown in FIGS. 14 and 15 except that the latch 250 is secured in a different manner. This latch is secured in the recess 210 by means of three socket head cap screws 252. These cap screws prevent the latch from rotating so that the break-away portion 254 thereof reemains remains the segmental recess 224. The cap screws may, if desired, be welded in place to prevent the possibility of their backing out.

FIGS. 18 to 20 show a latch for use in a connection having a female connector like the female connector 212 shown in FIGS. 14 to 17, this latch being for use in a connection which is not remotely releasable. Thus the latch 260 is in the form of a circular disc having a segment removed on one side so that the latch can be positioned, as seen in FIG. 18, so as to engage a segmental groove 262 in a cooperating male connector member 264 which is engaged with the female connector member 212. Alternatively it can be rotated 180° to the position shown in FIG. 19 for disengagement from the recess 262.

As shown, this embodiment of the latch is secured to the member 212 by means of a bushing 263 centrally received therein, three cap screws 266 being used to hold the bushing in place. The bottom of the disc is provided with a pair of dimples 268 to receive ball detents 270 spaced 180° apart and resiliently biased into engagement with the dimples as by means of a piece of rubber or other resilient material 272. The bushing 264 is not tight enough to wholly prevent rotation of the latch 260, but the latch can be rotated by means of a spanner wrench, such as the wrench 274 shown in FIG. 20, which is provided with projections 276 proportioned to fit into sockets 278 in the latch and with handles 280 for turning the wrench.

With this design the apparatus will normally be received by the customer with the latch in the position shown in FIG. 19. Once the connection is assembled together the latch can be rotated to the position shown in FIG. 18, so that the member 212 and 264 cannot then be disengaged.

A variation of this design 15 as shown in FIGS. 21 to 23, wherein the latch 260 is held in place by means of a bushing 244, as used in the embodiment of FIGS. 14 and 15, and a cap screw 214. As in the previous embodiment, the latch is rotated by engagement of a spanner wrench 274 in the sockets 278.

It is particularly desirable that the latches such as are used in the present invention be designed so that inertial forces resulting from hammering on the ends of pipes which are connected as described herein do not cause the latch to break loose from the connector members. The embodiments of the latch of this invention which have heretofore been described are so designed.

With this limitation the various embodiments of latch disclosed herein may be oriented in any desired manner. Thus the pipe string may be assembled with male connector members extending upwardly or with female connector members extending upwardly, and either portion of the latch means, that is the latch itself or its receptable, may be on either the upper or the lower member. The releasing tool engages the latch in the same way from either direction.

It will be apparent to those skilled in the art that heat treated steels will be most desirable for making the latches used in the apparatus of this invention, although those embodiments which utilize a breakaway portion for release should have a brittleness such that breaking is readily accomplished by the force applied by the releasing tool. In such a case the latch should be made of a material susceptible to notch failure, such as cast iron, desulfurized iron, or a ductile iron having a low elongation of, for example, 5%, an ultimate strength of about 80,000 psi, and a yield strength of about 55,000 psi. Certain heat treated steels and stainless steels are also susceptiible to notch failure, as is well known in the art.

Desirably the latch is designed to break with a striking force of, for example, about 1,000 foot pounds, and the releasing tool is designed to deliver a minimum of, for example, about 2,000 foot pounds.

The various embodiments of the latch of this invention are designed so that they are almost certain to be releasable by dropping the releasing tool down the pipe string. However, in the event of some unforeseen occurrence which prevents this, it is still possible for a diver to go down and release the latches manually.

Although various embodiments of the invention have been shown and described herein, it is apparent that many modifications thereof will be suggested to those skilled in the art, and the invention therefore is not limited to the specific embodiments shown but extends to the full scope defined by the appended claims.

I claim:

1. A structure comprising
first and second tubular connectors having bores therethrough adapted to engage each other to coaxially connect a pair of pipes,
a port in the wall of one of said connectors,
cooperative latch means on the outside of said connectors adapted to be positioned, when said connectors are in engagement, to latch said connectors against disengagement,
the latch means on the first connector having a portion engageable with the latch means on the second connector, and
disengagement means extending through said port and projecting into said bore of said one connector operable by a releasing tool inside said bore without the releasing tool extending into said port to cause disengagement of said portion from the latch means on the second connector, whereby the connectors may be disengaged.

2. A structure as defined by claim 1 and including
a releasing tool adapted to be lowered through one of the connected pipes to the level of said tubular connectors, said tool having means thereon engageable with the disengagement means, upon vertical movement of the tool, to operate said disengagement means.

3. A structure as defined by claim 2 wherein the disengagement means comprises a bar extending radially through and slidable in the port in the wall of said one connector, and said releasing tool includes a camming surface engageable with the radially inward end of said bar upon downward movement of said releasing tool to cause the bar to be moved radially outwardly to cause said disengagement of said portion.

4. A structure comprising
first and second tubular connectors adapted to engage each other to coaxially connect a pair of pipes,
cooperative latch means on the outside of said connectors adapted to be positioned, when said connectors are in engagement to latch said connectors against disengagement,
the latch means on the first connector having a portion engageable with the latch means on the second connector,
disengagement means extending through the wall of one of said connectors operable from the inside of said one connector to cause disengagement of said portion from the second connector, whereby the connectors may be disengaged,
a releasing tool adapted to be lowered through one of the connected pipes to operative relationship with said disengagement means,
said disengagement means comprises a bar extending radially through and slidable in the wall of said one connector, and said releasing tool includes a camming surface engageable with the radially inward end of said bar to cause the bar to be moved radially outwardly to cause said disengagement of said portion, and
wherein the latch means on the first connector includes a relatively weak connection to said portion, and said bar is positioned to engage said portion, so that upon radially outward motion of said bar, said portion is broken off.

5. A structure, comprising:
first and second tubular connectors adapted to engage each other to coaxially connect a pair of pipes,
cooperative latch means on the outside of said connectors adapted to be positioned, when said connectors are in engagement, to latch said connectors against disengagement,
the latch means on the first connector having a portion engageable with the latch means on the second connector,
disengagement means extending through the wall of one of said connectors operable from the inside of said one connector to cause disengagement of said portion from the second connector, whereby the connectors may be disengaged,
a releasing tool adapted to be lowered through one of the connected pipes to operative relationship with said disengagement means,
said disengagement means comprises a bar extending radially through and slidable in the wall of said one connector, and said releasing tool including a camming surface engageable with the radially inward end of said bar to cause the bar to be moved radially outwardly to cause said disengagement of said portion, and
wherein the latch means on the first connector is movable from engaged position to disengaged position, and includes a cam surface engageable by said bar upon radially outward movement of said bar to move said first connector latch means to disengaged position.

6. A structure as defined by claim 4 wherein said first connector latch means is a circular disc and said second connector latch means is a circular disc and said second connector latch means is a segmented groove proportioned to receive a segment of said disc, said segment being comprised in said portion.

7. A structure as defined by claim 6 wherein said disc is closely fitted in a circular recess in the wall of said first connector.

8. A structure as defined by claim 4 wherein said first connector latch means comprises an elongate member fastened to said first connector.

9. A structure comprising a string of pipe comprising a plurality of joints connected together, first and second tubular connector means having bores therethrough on the adjoining ends of each connected pair of joints, one set of said connector means being remotely disengageable, a port in the wall of one of said disengageable set of connector means, cooperataive latch means on the outside of each of said first and second connectors adapted to secure said connectors against disengagement, the latch means on each first connector having a portion engageable with the latch means on the adjoining second connector, and disengagement means extending through said port and projecting into said bore of said one of said connector means of said remotely disengageable set, operable by a releasing tool inside said bore without the releasing tool extending into said port to cause disengagement of said portion from the latch means on the adjoining second connector, whereby said one connector may be disconnected from its adjoining connector to break the string of pipe.

10. A structure as defined by claim 9 wherein only one pair of first and second connector means in said string have the disengagement means.

11. A structure as defined by claim 9 and including a releasing tool adapted to be lowered through said string of pipe to the level of said tubular connectors, said tool having means thereon engageable with the disengagement means, upon vertical movement of the tool, to operate said disengagement means.

12. The structure of claim 11 wherein said releasing tool includes indicator means to indicate engagement of said disengagement means by said engageable means of said well tool.

13. A structure as defined by claim 11 wherein said disengagement means comprises a bar extending radially through and slidable in the port in the wall of said one connector, and said releasing tool includes a camming surface engageable with the radially inward end of said bar to cause said bar upon downward movement of said releasing tool to be moved radially outwardly to cause said disengagement of said portion.

14. A structure comprising a string of pipe comprising a plurality of joints connected together, first and second tubular connector means on the adjoining ends of each connected pair of joints, one set of said connector means being remotely disengageable, cooperative latch means on the outside of each of said first and second connectors adapted to secure said connectors against disengagement, the latch means on each first connector having a portion engageable with the latch means on the adjoining second connector.

disengagement means extending through the wall of one of the connectors of the remotely disengageable set, operable from the inside of said one connector to cause disengagement of said portion from the adjoining second connector, whereby said one connector may be disconnected from its adjoining connector to break the string of pipe, a releasing tool adapted to be lowered through said string of pipe to operative relationship with said disengagement means, said disengagement means comprising a bar extending radially through and slidable in the wall of said one connector, and said releasing tool including a camming surface engageable with the radially inward end of said bar to cause bar to be moved radially outwardly to cause said disengagement of said portion, and wherein the latch means on the first connector of the remotely disengageable set includes a relatively weak connection to said portion, and said bar is positioned to engage said portion, so that upon radially outward motion of said bar, said portion is broken off.

15. A structure, comprising:

a string of pipe comprising a plurality of joints connected together, first and second tubular connector means on the adjoining ends of each connected pair of joints, one set of said connector means being remotely disengageable, cooperative latch means on the outside of each of said first and second connectors adapted to secure said connectors against disengagement, the latch means on each first connector having a portion engageable with the latch means on the adjoining second connector, disengagement means extending through the wall of one of the connectors of the remotely disengageable set, operable from the inside of said one connector to cause disengagement of said portion from the adjoining second connector, whereby said one connector may be disconnected from its adjoining connector to break the string of pipe, a releasing tool adapted to be lowered through said string of pipe to operative relationship with said disengagement means, said disengagement means comprising a bar extending radially through and slidable in the wall of said one connector, and said releasing tool, including a camming surface engageable with the radially inward end of said bar to cause said bar to be moved radially outwardly to cause said disengagement of said portion, and wherein the latch means on the first connector of the remotely disengageable set is movable from engaged position to disengaged position, and includes a cam surface engageable by said bar upon radially outward movement of said bar to move such first connector latch means to disengaged position.

16. A structure as defined in claim 14 wherein said first connector latch means is a circular disc and said second connector latch means is a segmental groove proportioned to receive a segment of said disc, said segment being comprised in said portion.

17. A structure as defined by claim 16 wherein said disc is closely fitted in a circular recess in the wall of said first connector.

18. A structure as defined by claim 14 wherein said first connector latch means comprises an elongate member fastened to said first connector.

19. A structure comprising
first and second tubular connectors adapted to engage each other to coaxially connect a pair of pipes,
cooperative latch means on the outside of said connectors adapted to be positioned, when said connectors are in engagement, to latch said connectors against disengagement,
the latch means on the first connector having a portion engageable with the latch means on the second connector, and
disengagement means extending through the wall and into the bore of one of said connectors operable from the inside of the bore to cause disengagement of said portion from the second connector, whereby the connectors may be disengaged, and
wherein the latch means on the first connector includes a relatively weak connection to said portion, and said bar is positioned to engage said portion, so that upon radially outward motion of said bar, said portion is broken off.

20. A structure comprising
a string of pipe comprising a plurality of joints connected together,
first and second tubular connector means on the adjoining ends of each connected pair of joints, one set of said connector means being remotely disengageable,
cooperative latch means on the outside of each of said first and second connectors adapted to secure said connectors against disengagement,
the latch means on each first connector having a portion engageable with the latch means on the adjoining second connector, and
disengagement means extending through the wall and into the bore of one of the connectors of the remotely disengageable set, operable from the inside to cause disengagement of said portion from the adjoining second connector, whereby said one connector may be disconnected from its adjoining connector to break the string of pipe, and
wherein the latch means on the first connector of the remotely disengageable set includes a relatively weak connection to said portion, and said bar is positioned to engage said portion, so that upon radially outward motion of said bar, said portion is broken off.

21. The structure of claim 2 wherein said releasing tool includes indicator means to indicate engagement of said disengagement means by said engageable means of said well tool.

* * * * *

UNITED STATES PATENT AND TRADEMARK OFFICE
CERTIFICATE OF CORRECTION

PATENT NO. : 3,948,545
DATED : APRIL 6, 1976
INVENTOR(S) : JAMES VAULL BONDS

It is certified that error appears in the above-identified patent and that said Letters Patent are hereby corrected as shown below:

Column 1, line 23: After "offshore", delete "plateform" and insert -- platforms --.

Column 1, line 65: After "cold", insert -- or --.

Column 3, line 57: After "the", delete "conductors" and insert -- connectors --.

Column 5, line 2: After "this", delete "latach" and insert -- latch --.

Column 6, line 60: After the second instance of "the", delete "capa" and insert -- cap --.

Column 7, line 5: After "similarly", delete "to" and insert -- as --.

Signed and Sealed this

Twentieth Day of July 1976

[SEAL]

Attest:

RUTH C. MASON
*Attesting Officer*

C. MARSHALL DANN
*Commissioner of Patents and Trademarks*